March 5, 1957

F. W. SEYBOLD 2,783,843

TWO-HAND CONTROL DEVICE FOR THE ELECTRIC CLUTCH AND
BRAKE MECHANISMS OF PAPER CUTTING MACHINES

Filed Sept. 21, 1953

INVENTOR.
FREDERICK W. SEYBOLD

BY
Ostrolenk & Faber
ATTORNEYS

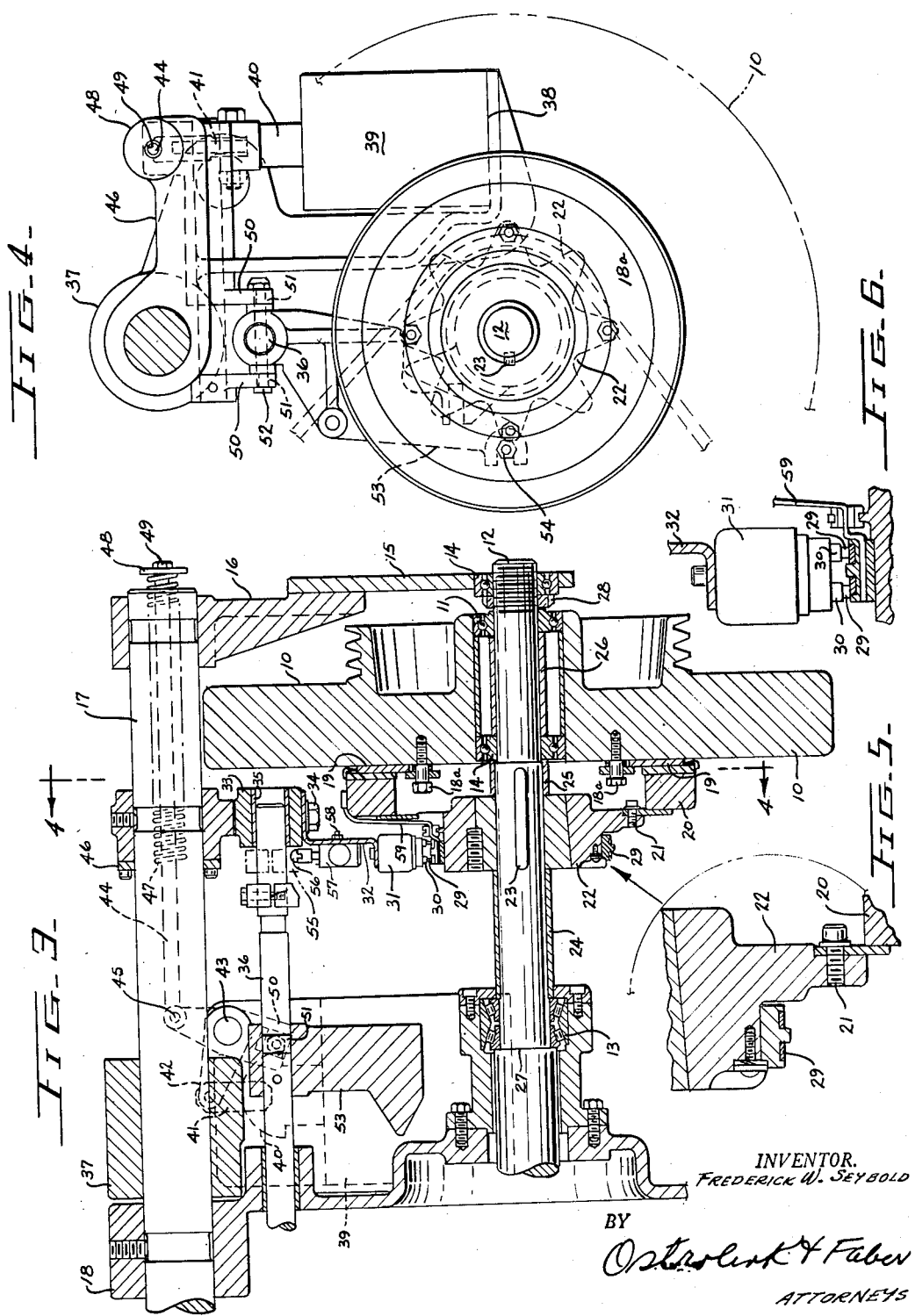

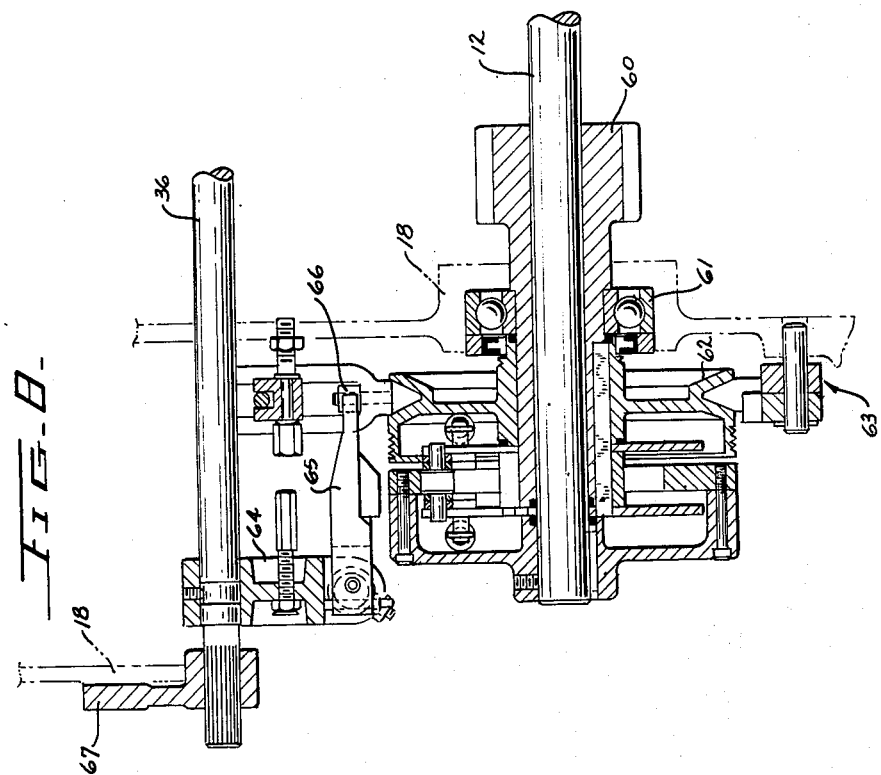
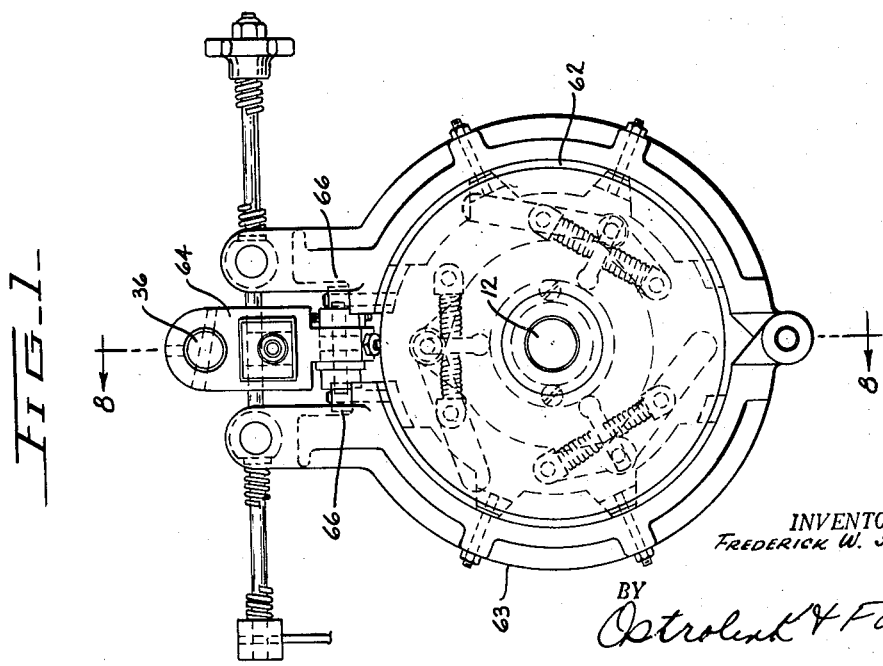

March 5, 1957　　　F. W. SEYBOLD　　　2,783,843
TWO-HAND CONTROL DEVICE FOR THE ELECTRIC CLUTCH AND
BRAKE MECHANISMS OF PAPER CUTTING MACHINES
Filed Sept. 21, 1953　　　　　　　　　　6 Sheets-Sheet 4

INVENTOR.
FREDERICK W. SEYBOLD
BY
Ostrolenk & Faber
ATTORNEYS

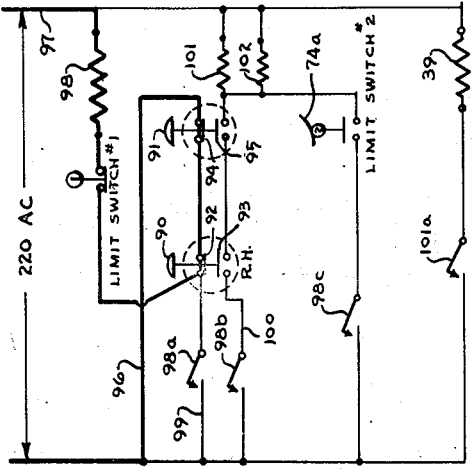

March 5, 1957 F. W. SEYBOLD 2,783,843
TWO-HAND CONTROL DEVICE FOR THE ELECTRIC CLUTCH AND
BRAKE MECHANISMS OF PAPER CUTTING MACHINES
Filed Sept. 21, 1953 6 Sheets-Sheet 6

INVENTOR.
FREDERICK W. SEYBOLD

BY
Ostrolenk & Faber
ATTORNEYS

United States Patent Office 2,783,843
Patented Mar. 5, 1957

2,783,843

TWO-HAND CONTROL DEVICE FOR THE ELECTRIC CLUTCH AND BRAKE MECHANISMS OF PAPER CUTTING MACHINES

Frederick W. Seybold, Westfield, N. J., assignor to E. P. Lawson Co., Inc., New York, N. Y., a corporation of New York Application September 21, 1953, Serial No. 381,435

3 Claims. (Cl. 164—54)

My present invention is directed to paper cutting mechanisms of the guillotine type and more particularly is an improved two-hand starting device for an electric clutch used as a control device for a machine of the general type shown in Patent No. 2,570,873 issued to me on October 9, 1951.

In the patent referred to, there was disclosed a paper cutting machine having incorporated therein a clutch assembly of the mechanical plate type operated by a two-hand throw-in or starting mechanism. The mechanical plate clutch was so arranged as to be thrown in responsively to two-hand manual operation of a lever handle and rotary knob, respectively.

The clutch operation further was so designed as to permit only a single cycle operation of the guillotine knife each time the clutch was thrown in or engaged, the clutch becoming automatically disengaged near the end of the cycle to prevent recycling. A safety pin, and a brake release mechanism were tied into the clutch operation in such a way as to ensure against repeat operation in the event of improper functioning and to ensure further the release of the brake only as and when a cycle was to occur.

In Patent No. 2,521,486 issued to me on September 5, 1950, an electric clutch and brake mechanism for guillotine paper cutting machines is disclosed. Thus, it may appropriately be stated that heretofore it has been proposed to utilize an electric clutch assembly interrelated with a brake mechanism by electrically actuated means in such a way as to effect coactive operation thereof in machines of this type. However, Patent No. 2,521,486 was concerned mainly with a combined operation of an electric clutch and brake. The present invention includes a joint electric clutch and brake operation but is directed more especially to a two-hand electrical starting means for such an operation.

In the present invention, an electric clutch, standard per se, is substituted for the mechanical plate clutch. Two-hand manual operation of the clutch starting mechanism is retained with a pair of starting buttons being utilized instead of a rotary knob and lever handle. The withdrawal of the safety pin and the releasing of the brake must be carried out, however, before the clutch is energized and the machine set in motion. This is accomplished by a novel mechanical linkage actuated in one direction by a solenoid and in the opposite direction by a spring. The feature of pushing in a safety pin by a cam and latching it in place, shown in Patent No. 2,570,-873, has been retained. Assurance that the machine will not recycle if the clutching or braking assemblies malfuntion is thus obtained.

It is a broad object of the present invention to improve generally upon the two-hand wholly mechanical clutch starting operation disclosed in the patent referred to above by the use of an electromechanical linkage that will allow push-button operation without, however, sacrificing either efficiency or safety in operation, it being important to note in this regard that the two-hand operation required as a safety measure by many state laws is retained.

A more specific object is to incorporate in the mechanism an electric circuit that will ensure safe operation by causing the machine to make one cycle and then stop, even though both starting buttons are held in depressed position by the operation.

A second more specific object is to embody in the electric circuit a feature that will enable the operator to release both starting buttons as soon as the knife has reached the cutting stick with the machine continuing to operate to an extent sufficient to return the knife to its upper stopping position, there to stop through the automatic application of the brake.

These and many other objects of my invention will become apparent in the following description and drawings in which:

Figure 3 is an enlarged sectional view taken substantially on line 3—3 of Figure 2 showing the clutch mechanism.

Figure 4 is a sectional view through the clutch mechanism taken substantially on line 4—4 of Figure 3.

Figure 5 is a fragmentary greatly enlarged detail sectional view of the clutch hub and collector rings.

Figure 6 is a view similar to Figure 5 showing the brushes and brush holder assembly box.

Figure 7 is an enlarged front elevational view of the brake mechanism.

Figure 8 is a sectional view taken substantially on line 8—8 of Figure 7.

Figures 11, 12, 13, 14, 15, and 16 are diagrammatic views of the main electric circuit shown at successively following stages of the operation of the invention.

Figure 17 is a diagrammatic illustration of the clutch operating circuit showing a condition obtaining when the main circuit is in the condition shown in Figures 11, 12, 15, and 16.

Figure 18 is a view like Figure 17 showing a clutch circuit condition persisting when the main circuit is in its Figure 13 condition.

Figure 19 is a view similar to Figures 17 and 18, the main circuit being in its Figure 14 condition.

Figure 1:
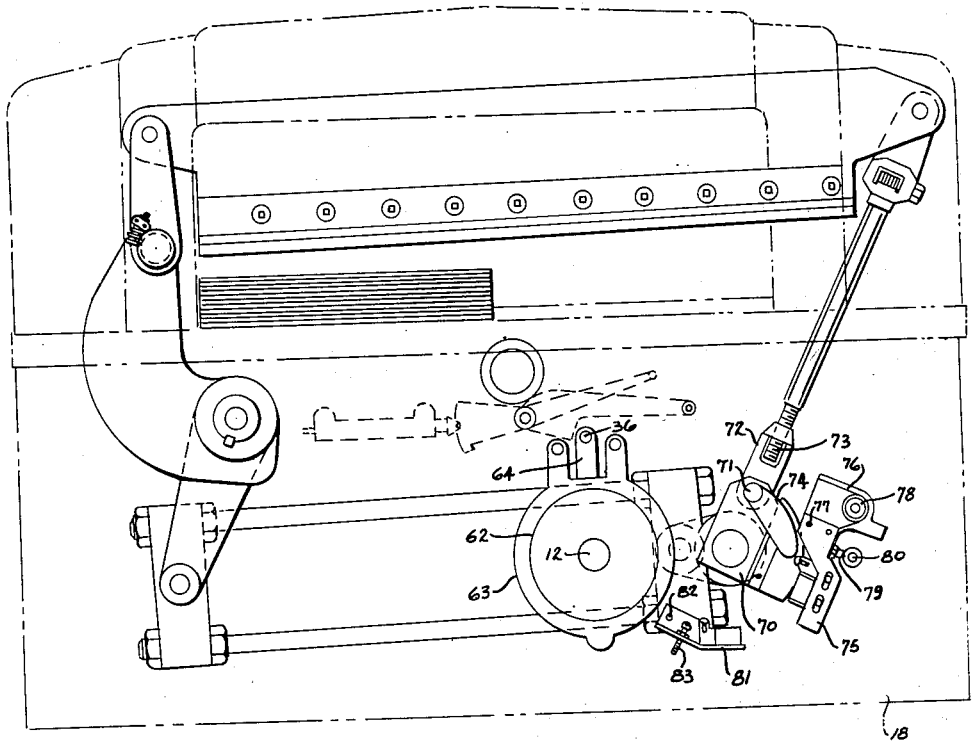
Figure 1 is a front elevational view of the knife assembly and of the electrically controlled clutch mechanism constituting the present invention, the column casting, table, and related framing members being shown in dotted outline.
Figure 2:
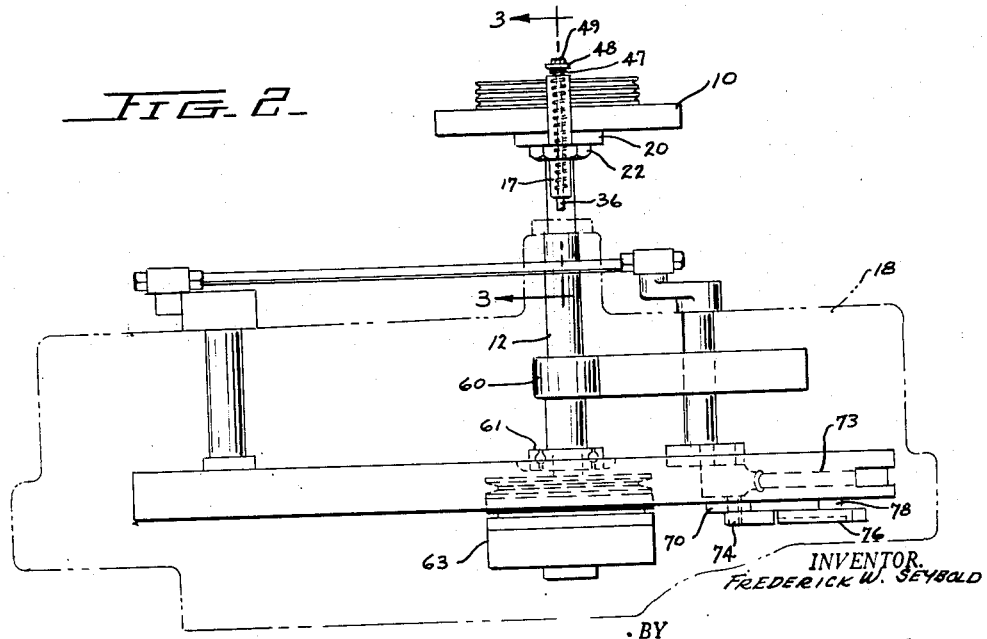
Figure 2 is a top plan view.

In the drawing Figures 1 and 2 have been included mainly to show the general organization of the clutch assembly, brake, cam-controlled limit switches, knife, and the knife operating linkages in a machine of the type stated. Other parts which might ordinarily be seen in a general view such as the gearing used as part of the clamp and knife drive, and the clamp mechanism have been omitted for the sake of clarity.

Figure 9:
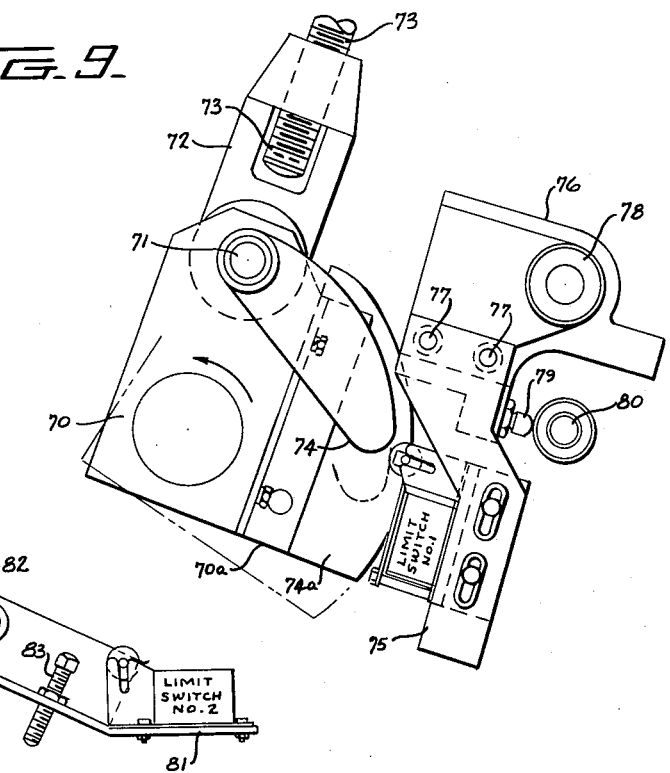
Figure 9 is an enlarged fragmentary front elevational view of the limit switch means and of the operating cams associated therewith in one position.
Figure 10:
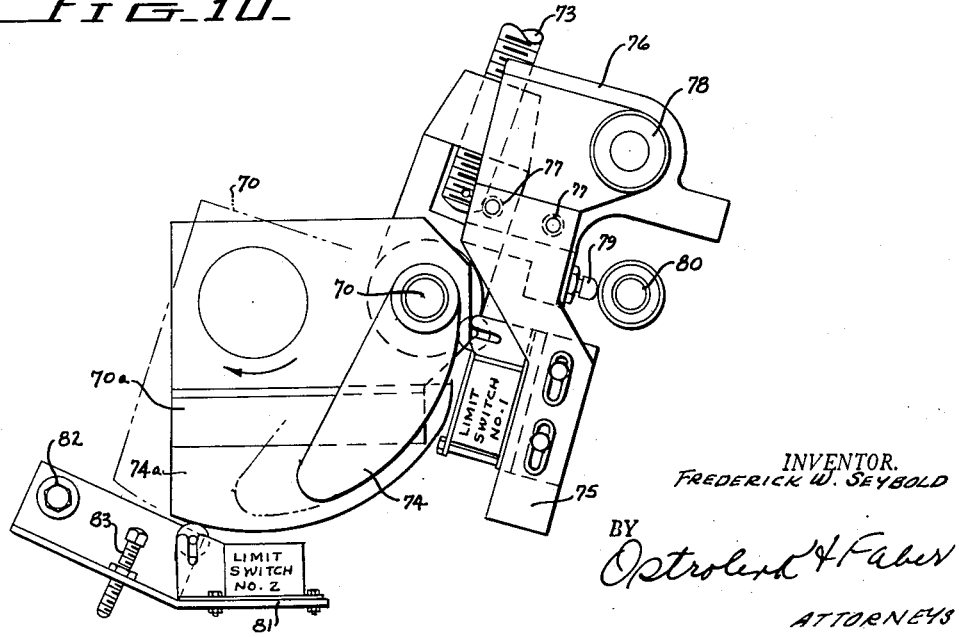
Figure 10 is a view like Figure 9 in which the operating cams are in a second position.

Figures 3 through 6 show mainly the clutch mechanism and the electrically controlled mechanical linkage associated therewith. Figures 7 and 8 are directed to the brake construction and to the extension of the clutch controlling mechanical linkage whereby the brake operation is correlated with the clutch operation. In Figures 9 and 10 the limit switch assembly is detailed, and the remaining figures of the drawing are all directed to circuit diagramming incident to the timed functioning of the clutch and brake.

Clutch mechanism and mechanical control linkage therefor

Referring to Figure 2, and more particularly to Figure 3, a flywheel 10 is continuously driven from a suitable source of motive power, not shown, by V-belts, also not shown, trained about a pulley integral with the flywheel. The flywheel is freely rotatable upon bearings 11 circumposed above a drive shaft 12. Drive shaft 12, when rotated, brings into motion a knife and clamp operating gear train, not shown in the drawing comprising a part of this application, but illustrated to advantage in Patent No. 2,570,873.

The drive shaft is journalled, at locations spaced along its length, in bearings 13 and 14. Bearing 14 is mounted in a plate 15 rigid with and depending from a bracket 16 carried by the outer end of a support shaft 17. Support shaft 17 is supported by and projects outwardly from the column casting 18 of the paper cutting machine. Bearing 13 is carried by a recessed bearing support member bolted to the column casting.

Cooperating clutch members of an electric clutch device, standard per se, are secured fixedly to the flywheel and drive shaft, respectively, and when engaged cause the drive shaft to be driven by the continuously rotating flywheel. An annular series of studs 18a fastens one of these members, a flat clutch driving ring or armature 19, to that face of flywheel 10 remote from the pulley extension, concentrically with the flywheel. The other clutch member includes an annular magnet shell 20 which contains the magnetic coil that attracts armature 19 when energized. Shell 20 is secured by circumferentially spaced screws 21 to and in concentricity with a clutch hub 22 keyed as at 23 to the drive shaft 12.

To locate the clutch hub, flywheel bearing and the bearing 13 in their predetermined positions along the length of the drive shaft, a spacer sleeve 24 is circumposed about the shaft between the bearing 13 and clutch hub, and spacer sleeves 25 and 26 are also applied to the drive shaft in abutting relation to the clutch hub and flywheel bearing, respectively. The spacer sleeves and the drive wheel assembly components engaged thereby are then held in place between a shoulder 27 formed on the drive shaft and a lock nut 28 threaded on the outer end of the drive shaft.

Mounted on the clutch hub (Figures 3, 5, and 6) are side-by-side collector rings 29 engaged by spaced brushes 30. The brushes 30 are carried by a brush holder assembly box 31 rigidly fastened to one end of a Z-shaped bracket 32, the other end of which is fixedly attached to a bracket 33 by screws 34. Bracket 33 depends from the elongated support shaft 17 and has a bushing lined guide opening 35 for one end of a shifter shaft 36.

Supported upon the shaft 17 and spaced longitudinally thereof from the bracket 33 is a bracket 37 integrally formed with a depending foot 38 (Figure 4) having a horizontally extending ledge on which is supported a solenoid 39. The upwardly extending plunger 40 of the solenoid is pivotally connected to one end of a short link 41, the other end of which is attached pivotally to one arm of a bell crank 42 fixed intermediate its ends to a rock shaft 43 journalled in the bracket 37. A rod 44 is pivotally connected at 45 to the other end of the bell crank and is spaced laterally from the support shaft 17 in parallelism therewith.

A support plate 46, attached to bracket 33, extends laterally from the support shaft and is apertured at its free end for extension of rod 44 therethrough. The plate serves as an abutment for one end of a coil spring 47, circumposed about the rod with its other end bearing against a washer 48 that is carried by the free end of the rod and is held on the rod by a screw 49 threaded axially into said free end of the rod. The spring is held under compression and normally urges the rod 44 to the right in Figure 3 to pull the solenoid plunger upwardly to the normal position assumed thereby when the solenoid is de-energized.

Two short depending arms 50 are fixed to and are spaced longitudinally of the rock shaft 43. These have slots in their lower ends in which guide blocks 51 are slidable along lines radial of the rock shaft. A headed bolt 52, parallel to the rock shaft, passes through the blocks and through a transverse bore in the shifting shaft. The bolt additionally passes through the upper end of a lever 53 depending from the shifting shaft and adapted to operate a safety pin 54, the structural and functional details of which are not shown herein since they are fully set forth in Patent No. 2,570,873. Thus, the spring 47 normally tends to shift the shaft 36 to the left in Figure 3, while solenoid 39 when energized shifts said shaft to the right, overcoming the tension of the spring.

Also mounted on the shaft 36 is a switch actuating cam 55 which contacts a small roller 56 on the arm of a micro-switch 57, thus closing or interrupting the magnet coil circuit in a manner to be made presently apparent. Switch 57 is secured to bracket 32 by screws 58. Leads 59 connect the collector rings to the magnet coil 20.

Brake mechanism and mechanical control linkage therefor

In Figures 1 and 2, and more especially in Figures 7 and 8, there is shown the brake assembly of the machine. The drive shaft 12 adjacent that end thereof remote from the flywheel extends through a long pinion 60 having a sleeve portion journalled on a ball bearing 61 mounted upon the column casting. A brake wheel 62 is keyed to the pinion. Cooperating with the brake wheel to halt the machine are brake shoes 63, said shoes being pivotally joined at one end.

A bracket 64 is suspended from the shifting shaft 36 and connected thereto is a brake spreader 65 of the cam wedge type extendable between rollers 66 mounted on the other ends of the brake shoes. As a result, when the shifting shaft is adjusted to the right responsive to energization of the solenoid 39, the shoes 63 will be spread apart, away from the brake wheel or drum 62, thus to release the brakes.

The remaining portions of the brake assembly are all substantially as shown and described in my Patent No. 2,570,873 and hence do not require detailed description herein.

The bracket 64 is fixed to the shaft 36 to move therewith, the shaft 36 being splined in a depending support bracket 67 carried by the column casting 18, thus to permit slidable movement of the shaft 36 relative to the column casting while at the same time holding the same against rotary motion.

From the description so far provided, it will be seen that when the solenoid 39 is energized, it will shift the cam 55 to a position in which it closes the micro-switch 57 while simultaneously releasing the brake.

Cam controlled limit switch assembly

Reference should now be had to Figures 9 and 10 and also Figure 1 wherein is shown a limit switch assembly used to control the length of a single knife operating cycle. This assembly includes a crank 70 secured at its inner end to one end of a driven shaft rotated by power transmitted from the drive shaft 12 through the gear train hereinbefore described. To the outer end of the crank there is connected a crank pin 71 and pivoted on the crank pin is a knife pull bar swivel 72 having a threaded socket in which is engaged the complementarily threaded lower end of a pull bar 73. The other end of the pull bar is connected to one end of the knife bar of the machine.

Connected to the other end of the knife bar is a second pull bar which is operated by a linkage extending therefrom to the other end of the driven shaft. It is not thought necessary to describe these knife operating linkages other than briefly herein since they are shown and described substantially in their illustrated form in Patent No. 2,574,501 issued to me and Nicholas Herman on November 13, 1951. It is thought mainly important to note, for the purposes of this application, that crank 70 is a motion translating driving connection between the driven shaft and the pull bar 73.

Fixed to the crank pin 71 is an elongated cam 74 extending substantially radially from the crank pin and formed along one side with a longitudinally curved cam surface adapted to bias inwardly a roller equipped switch arm or a normally closed limit switch, hereinafter called "Limit Switch No. 1" adjustably mounted on a bracket 75. The bracket has slots receiving studs carried by the limit switch, thus to permit accurate location of the limit switch in a generally vertical direction relative to cam 74. Bracket 75 is fixedly connected to an arm 76 by screws 77, arm 76 being journalled on a shaft 78 carried by the column casting so as to pivotally mount the entire switch assembly for swinging adjustment toward and away from the cam. An adjustment screw 79 is provided and is threaded in bracket 75 to bear against a stationary stub shaft 80 projecting outwardly from the column casting, thus to permit lateral adjustment of the switch.

The function of the cam 74 is to break a circuit (to be described in detail hereinafter) including a relay means that keeps the electric clutch and the solenoid 39 energized. Cam 74 will thus act to permit spring 47 to move the shifter shaft 36 to the left in Figures 3 and 8 to apply the brake and stop the machine.

A second cam 74a is fixed to an angle bracket 70a secured to the crank 70. Its function is to contact the roller of the switch arm of a normally open limit switch—hereinafter called "Limit Switch No. 2"—after the knife has reached the cutting stick and is on the upstroke. Limit Switch No. 2 is adapted, when thrown by cam action, to provide a maintaining circuit for the electric clutch and solenoid, thereby to permit the operator to release both push buttons.

Limit switch No. 2 is mounted on a bracket 81 pivoted upon a stud 82 projecting outwardly from the column casting. An adjusting screw 83, threaded in the bracket 81, engages a suitably located abutment on the column casting for locating the switch in correct position relative to cam 74a.

*Clutch and brake mechanism control circuits*

Reference should now be had to Figures 11-19. In these several figures, the circuits embodied in the invention are shown in various successively following stages during a single cycle of the mechanism involving a downstroke of the knife and its return upstroke. In each figure, the part of the circuit through which current is flowing has been shown in heavy lines.

The two-hand operation of the clutch starting mechanism involves the pressing of two push buttons or hand switches so located upon the machine as to require that both hands be used to depress them. These buttons have been designated as 90, 91. Each has a pair of bridging contact elements, the contact elements of switch 90 being designated 92, 93 and those of switch 91 being designated 94, 95. In the normal inoperative positions of the switches, the elements 92, 94 bridge spaced pairs of contacts of a lead 96 constituting one of a pair of leads extending from a source of electric power, the other power lead being designated by the reference numeral 97.

In this circuit condition, shown in Figure 11, current will flow through a relay 98. Relay 98 has three contacts 98a, 98b, 98c and as a result of energization of relay 98, these will move to closed position as shown in Figure 12. The closing of relay contacts 98a results in the closing of a circuit wherein current flows through lead 96, a lead 99, closed contacts 98a, normally closed limit switch No. 1, holding relay 98, and lead 97 (Figure 12). This circuit is maintained even though the operator now depresses the push buttons 90 and 91.

The operator having now depressed both push buttons 90 and 91 (Figure 13) the bridging elements 93, 95 thereof will bridge the contacts of a lead 100. As a result, a run starter coil 101, and a secondary holding relay 102 will be energized. Energizing of the coil 101 will close run starter contacts 101a thereby causing energization of solenoid 39 (Figure 13). Two contacts 102a and 102b of relay 102 also close (Figure 18) as a result of energization of relay 102. These are disposed in a separate clutch coil circuit, separately connected by leads 103, 104 to the source of electric power (see Figures 17-19).

The circuit including contacts 102a, 102b, also includes the micro-switch 57 and the coil 105 of the clutch. Therefore, with contacts 102a and 102b closed and solenoid 39 energized, the micro-switch 57 will close since the solenoid 39 will cause shifter shaft 36 to move to the right of Figure 3, moving cam 55 to the dotted line switch arm engaging position thereof.

A circuit condition as shown in Figure 19 will now be established. The clutch coil 105 will be energized, engaging the clutch and setting the machine in motion. The knife will descend and during the descent, the operator must keep both push buttons 90, 91 depressed in the Figure 13 position.

At about the time the knife has reached the cutting stick, cam 74a will have closed the normally open contacts of limit switch No. 2. As a result, this switch will close to produce circuit conditions diagrammed in Figures 14 and 19 wherein it is shown that a holding circuit is set up including limit switch No. 2, run starter coil 101, and relay 102. This keeps solenoid 39 and clutch coil 105 energized even though with the knife moving into its up stroke, the operator removes his hands from the push buttons 90, 91.

Finally (Figure 15) cam 74a runs off limit switch No. 2, thereby breaking the circuit that held the solenoid 39, clutch coil 105 and run starter coil 101 energized. Spring 47 will now shift shaft 36 to the left in Figure 8 causing the brake to be applied to stop the machine.

Reference should now be had to Figure 16 showing a circuit condition that would obtain if an operator were to fail to release both push buttons at the end of a full cycle, thus tending to cause recycling or repeat operation.

To prevent such an occurrence, normally closed limit switch No. 1 is provided in the circuit including the relay 98. As a result, at the end of the cycle, the cam 74 will actuate limit switch No. 1 momentarily to an open position. The circuit for keeping the coil 101, coil 102 and the holding circuit energized is thus interrupted even if the push buttons are still depressed.

The machine will now stop and cannot be restarted unless both push buttons are first released to energize relay 98 for closing contacts 98a, 98b and 98c once again. The starting of the machine for a new cycle may now be carried out in the manner detailed above.

In the foregoing I have described my invention in connection with a preferred embodiment thereof. Since many modifications and variations will now be obvious to those skilled in the art, I prefer to be bound not by the specific disclosures herein contained but only by the appended claims.

I claim:

1. In a paper cutting apparatus having an electric clutch and a mechanically powered brake mechanism linked for engagement of the clutch simultaneously with release of the brake, and for clutch disengagement simultaneously with setting of the brake, an electro-mechanical linkage for effecting joint control of said mechanisms comprising a shifter shaft movable in the direction of its length between the clutch and brake; a normally open switch adjacent the clutch connected electrically thereto for energizing the clutch when closed for engagement of the clutch; and a pair of cam members spaced longitudinally of the shifter shaft adjacent the clutch and brake, respectively, said cam members being respectively disposed to bias the switch to closed position and release the brake responsive to movement of the shifter shaft in one direction, and to permit return of the switch to open position and set the brake responsive to movement of the shifter shaft in a return direction.

2. In a paper cutting apparatus of the guillotine type having a single cut knife bar cycle and means including an electric clutch for driving the knife bar through said cycle, a two-hand clutch control device comprising means including a solenoid operated switch connected with said clutch for energizing the same; a pair of hand switches located to require two-hand operation and connected electrically with the solenoid for energizing the same under the control of an operator; a normally closed limit switch connected electrically with the solenoid to de-energize the same when opened; a cam carried by said knife drive means disposed for opening the limit switch momentarily at the completion of the single cut cycle; a second limit switch connected in circuit with said solenoid; and a second cam carried by the knife drive means, disposed for operating the second named limit switch momentarily to open position at the completion of the single cut cycle, thereby to prevent repeat operation of the knife bar.

3. In a paper cutting apparatus of the guillotine type having a knife bar drive assembly including a crank as one component thereof and including further an electric clutch controlling linkage of said drive assembly to a source of motive power, a two-hand clutch control device comprising a pair of hand switches disposed to require two-hand operation to close the same; a solenoid operated switch, the solenoid of which is connected electrically with said switches so as to be energized responsive to closing of both switches; means connected with the solenoid for energizing the clutch responsive to energization of the solenoid; a pair of limit switches connected electrically with the solenoid for, respectively, holding the same energized following release of the hand switches midway during a single cycle and de-energizing the solenoid at the end of a cycle; and a pair of cams fixed to the crank to swing through an arcuate path during rotation of the crank, said cams being respectively disposed for operating the respective limit switches during their travel through a single rotation cycle to throw the limit switches to their operative solenoid controlling positions.

References Cited in the file of this patent
UNITED STATES PATENTS

| | | |
|---|---|---|
| 899,324 | Riggs | Sept. 22, 1908 |
| 2,043,246 | Hawkes | June 9, 1936 |
| 2,570,873 | Seybold | Oct. 9, 1951 |
| 2,649,153 | Barley | Aug. 18, 1953 |

FOREIGN PATENTS

| | | |
|---|---|---|
| 645,970 | Germany | June 9, 1937 |